(12) United States Patent
Harvey

(10) Patent No.: US 7,782,397 B2
(45) Date of Patent: *Aug. 24, 2010

(54) ALTERNATIVE VIDEO SYNC DIRECTOR

(75) Inventor: Barry Harvey, Los Altos, CA (US)

(73) Assignee: Elantec Semiconductor, Inc., Milpitas, CA (US)

( * ) Notice: Subject to any disclaimer, the term of this patent is extended or adjusted under 35 U.S.C. 154(b) by 697 days.

This patent is subject to a terminal disclaimer.

(21) Appl. No.: 11/737,068

(22) Filed: Apr. 18, 2007

(65) Prior Publication Data

US 2007/0285567 A1 Dec. 13, 2007

Related U.S. Application Data

(60) Continuation of application No. 11/265,073, filed on Nov. 1, 2005, now Pat. No. 7,215,379, which is a division of application No. 10/453,210, filed on Jun. 3, 2003, now Pat. No. 6,977,692, which is a continuation of application No. 09/398,375, filed on Sep. 17, 1999, now Pat. No. 6,573,943.

(51) Int. Cl.
*H04N 5/06* (2006.01)

(52) U.S. Cl. .................. 348/521; 348/522; 348/524; 348/525

(58) Field of Classification Search .................. 348/521, 348/522, 524–525, 529, 530, 531; *H04N 5/06, H04N 5/08, 9/45, 9/455*
See application file for complete search history.

(56) References Cited

U.S. PATENT DOCUMENTS

| | | |
|---|---|---|
| 3,706,847 A | 12/1972 | Smeulers |
| 4,115,811 A | 9/1978 | Goff |
| 4,185,299 A | 1/1980 | Harford |
| 4,550,342 A | 10/1985 | Buchanan et al. |
| 4,667,235 A | 5/1987 | Nozoe et al. |
| 4,707,730 A | 11/1987 | Alard |
| 4,821,098 A | 4/1989 | Smeulers |
| 4,918,525 A | 4/1990 | Vladkov |
| 5,280,356 A | 1/1994 | Hirimatsu et al. |
| 5,486,869 A | 1/1996 | Cooper |
| 5,576,770 A | 11/1996 | Rumreich |
| 5,754,250 A | 5/1998 | Cooper |
| 5,867,222 A | 2/1999 | Norris et al. |
| 6,028,642 A | 2/2000 | Rinaldi et al. |
| 6,154,256 A | 11/2000 | Bruins |
| 6,208,173 B1 | 3/2001 | Redman-White |
| 6,573,943 B1 | 6/2003 | Harvey |
| 6,977,692 B2 | 12/2005 | Harvey |
| 7,215,379 B2 * | 5/2007 | Harvey .................. 348/521 |
| 2006/0061686 A1 | 3/2006 | Harvey |

* cited by examiner

*Primary Examiner*—Trang U Tran
(74) *Attorney, Agent, or Firm*—Fliesler Meyer LLP

(57) ABSTRACT

A video synchronization signal generating circuit includes a sample and hold circuit, a voltage divider and an amplifier. The voltage divider produces an adaptive voltage level based at least in part on an output of the sample and hold circuit. The amplifier, which receives a video signal, is connectable by switches in different configurations. In a first configuration the amplifier acts as a comparator to compare the adaptive voltage level with the video signal. An output of the amplifier in the first configuration is an output of the video synchronization signal generating circuit. In a second configuration the amplifier forms part of the sample and hold circuit.

20 Claims, 5 Drawing Sheets

ALTERNATIVE VIDEO SYNC DIRECTOR

PRIORITY CLAIM

This application is a continuation of U.S. patent application Ser. No. 11/265,073, filed Nov. 1, 2005 (now allowed), which is a divisional of U.S. patent application Ser. No. 10/453,210, filed Jun. 3, 2003 (now U.S. Pat. No. 6,977,692), which is a continuation of U.S. patent application Ser. No. 09/398,375, filed Sep. 17, 1999 (now U.S. Pat. No. 6,573,943). Each of these earlier filed applications, to which priority is claimed, is incorporated herein by reference.

BACKGROUND OF THE INVENTION

1. Field of the Invention

This invention relates to the field of video circuits. More particularly, this invention relates to a circuit for detecting synchronizing pulses embedded in composite waveforms of a video signal.

2. Description of the Related Art

FIG. 1 illustrates components of a composite video waveform. The composite video waveform contains: a horizontal sync pulse or sync tip used for receiver scan timing; a "breezeway" where the level is a reference for video intensity; a color burst which is a series of sinewaves at a very precise frequency and phase, used as a color reference; a back porch which is a level reference similar to the breezeway occurring after the color burst segment; and the picture occurring after the back porch, the picture being any possible signal up to a maximum level, and whose content is unpredictable to receiver electronics.

The video receiver systems must discover timing details from the sync tip. Unfortunately, the sync tip almost never has a known DC level. In fact, most composite signals are AC coupled and the average DC level varies unpredictably with picture content.

One method for providing a video signal timing reference is to use a circuit which uses the most negative going feature of the composite signal as a reference level. The composite video signal standard which is predominantly used in North America, the National Television Systems Committee (NTSC) standard, was designed to enable such a reference level to be set approximately 50 years ago.

A prior art circuit for setting a reference level at the most negative feature of a composite waveform is the clamping circuit shown in FIG. 2. The circuit includes a capacitor 200 having an input receiving the composite video signal input, and an output providing the composite video signal with its most negative voltage clamped to 0 volts. The circuit further includes a diode 202 and current sink 204 connecting the output of the capacitor 200 to ground. The diode 202 is assumed to be ideal so that it generates no DC offset. The current sink 204 provides a small pull down current IPULLDOWN to discharge the capacitor 200 and allow the clamped output signal to follow the varying content of the composite input.

A clamped output signal from the circuit of FIG. 2 is shown in FIG. 3. As shown in FIG. 3, the diode of FIG. 2 forces the capacitor coupled composite video signal's most negative voltage, here the sync tip voltage (VTIP), to ground level. Because the composite video signal provides transient currents, clamping may distort the composite signal and may be an undesirable method.

To provide a synchronization (sync) timing signal, the clamped output of the circuit of FIG. 2 is provided to a first terminal of comparator 400 shown in FIG. 4, while a DC offset voltage is provided to the second terminal of comparator 400. The sync timing signal is generated when the comparator output transitions. A DC voltage offset generator 402 provides the DC offset voltage at a desired "slice level" (VSLICE), as shown in FIG. 3, so that the sync timing signal is generated on an edge of the sync pulse at the voltage VSLICE approximately midway between the sync tip voltage level VTIP and the breezeway voltage level.

SUMMARY OF THE INVENTION

The present invention provides a circuit for following variations of the composite video signal, rather than clamping the most negative voltage of the composite video signal.

The present invention includes a negative peak detector with an input receiving the composite video signal and an output coupled to a first input of a first amplifier the first amplifier functioning as a comparator. The second input of the comparator receives the composite signal, and the output of the comparator provides a synchronization timing signal.

In one embodiment, the present invention further provides buffering at the input and output of the negative peak detector. Buffering is provided to the input with a second amplifier having a noninverting input receiving the composite video signal. The inverting input of the second amplifier is connected to a first terminal of a diode of the peak detector and also to a current source in the negative peak detector. The output of the second amplifier is connected to the second end of the diode of the negative peak detector. The second amplifier serves to buffer the composite video signal from the current source. Buffering at the output of the negative peak detector is provided by a third amplifier connected in a voltage follower configuration between the output of the negative peak detector and the comparator.

In one embodiment, the present invention also includes a voltage slice level offset generator connecting the output of the negative peak detector to the comparator. The slice level offset generator includes a sample and hold circuit and a resistor divider. The sample and hold circuit is configured to sample the composite video signal during the breezeway segment, color burst segment, or back porch segments of the composite video signal, or any combination of the segments. The output of the sample and hold circuit then provides a sample of these segments VREF to a first end terminal of the resistor divider. The second end terminal of the resistor divider is driven by the buffered output of the negative peak detector which provides a synchronization tip voltage signal VTIP, and the center terminal of the resistor divider is provided to the first input of the comparator. The comparator output can then provide a timing signal transitioning at a point VSLICE on the composite signal halfway between VTIP and VREF.

In another embodiment in accordance with the present invention, circuitry is configured to reduce amplifier DC offset which can cause errors in a perceived VSLICE level. The circuitry includes a first amplifier which receives the composite video signal and is connectable by switches in one of three positions TCOMP, TTIP and TH. In the TCOMP position the first amplifier acts as a comparator with no feedback to compare the value VSLICE+VTIP with the composite video signal. VSLICE is set between VTIP and VREF based on values stored on capacitors in the circuit. The TCOMP position is used prior to the negative going synchronization tip edge of the composite video signal. After the negative going edge of the synchronization tip, the circuit is set in the TTIP position. In the TTIP position, the output of the first amplifier is disconnected from providing the synchronization timing output, and is connected to provide buffering for a negative peak detector to store TTIP on a capacitor. After the synchronization tip, during the breezeway, color burst or back porch segments of the composite video signal, or during a desired combination of these segments the circuit is connected in the TH position. In the TH position, the first amplifier forms part of a sample and hold circuit for storing a value VREF on a capacitor. After the desired period for TH, the circuit is again connected in the TCOMP position for detection of the next negative going synchronization tip edge.

BRIEF DESCRIPTION OF THE DRAWINGS

Further details of the present invention are explained with the help of the attached drawings in which.

DETAILED DESCRIPTION

The present invention provides a circuit for establishing a sync tip baseline without clamping the most negative portion of the composite signal to a known value. Instead of clamping the sync tip, the negative peak detector follows variations in the composite signal. The circuit of the present invention includes a negative peak detector as shown in FIG. 5.

Figure 1:
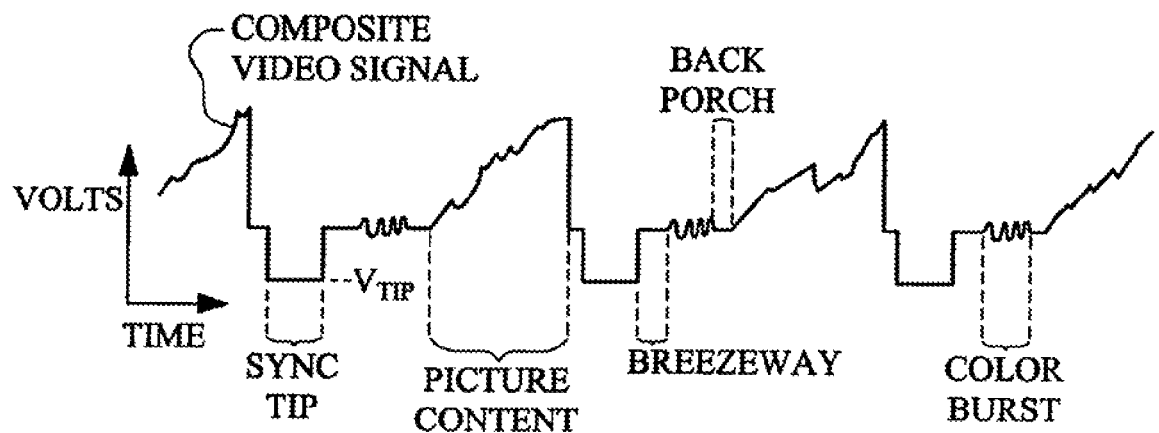
FIG. 1 shows a composite video signal.
Figure 2:
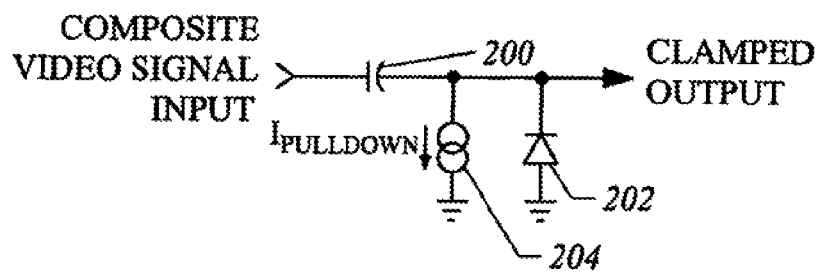
FIG. 2 shows a prior art circuit for clamping the most negative voltage of a composite video signal.
Figure 3:
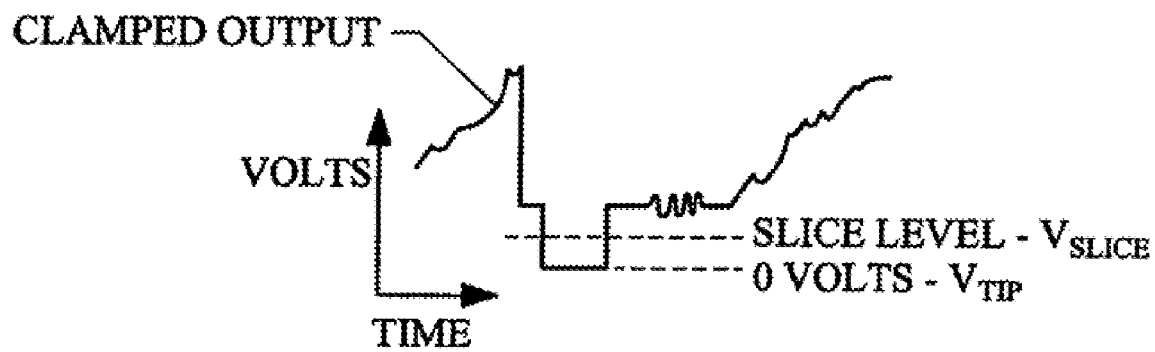
FIG. 3 shows a clamped composite video signal output from the circuit of FIG. 2.
Figure 4:
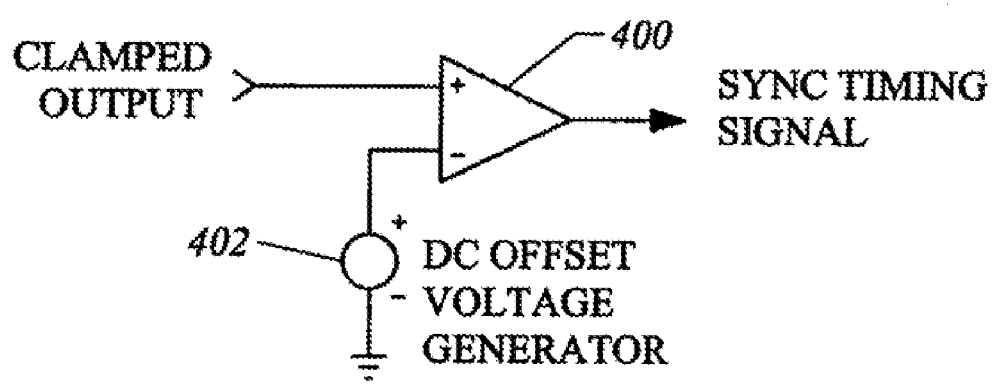
FIG. 4 shows circuitry used with the circuitry of FIG. 2 to generate a synchronization timing signal.
Figure 5:
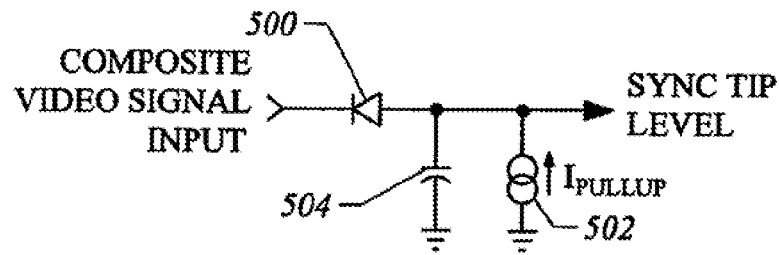
FIG. 5 shows a negative peak detector according to the present invention for providing a voltage reference at the sync tip voltage level of a composite video signal.

As shown in FIG. 5, the negative peak detector is a rectifier including a p-n type bipolar diode 500, or other rectifying element, with the composite video signal provided to the n terminal and the sync tip level output provided at the p terminal. The negative peak detector also includes a weak current source 502 and a capacitor 504 connecting the p terminal of diode 500 to ground. The current source 502 functions to charge the capacitor 504. The output of the negative peak detector is a reference voltage which tracks the sync tip voltage level VTIP.

Figure 6:
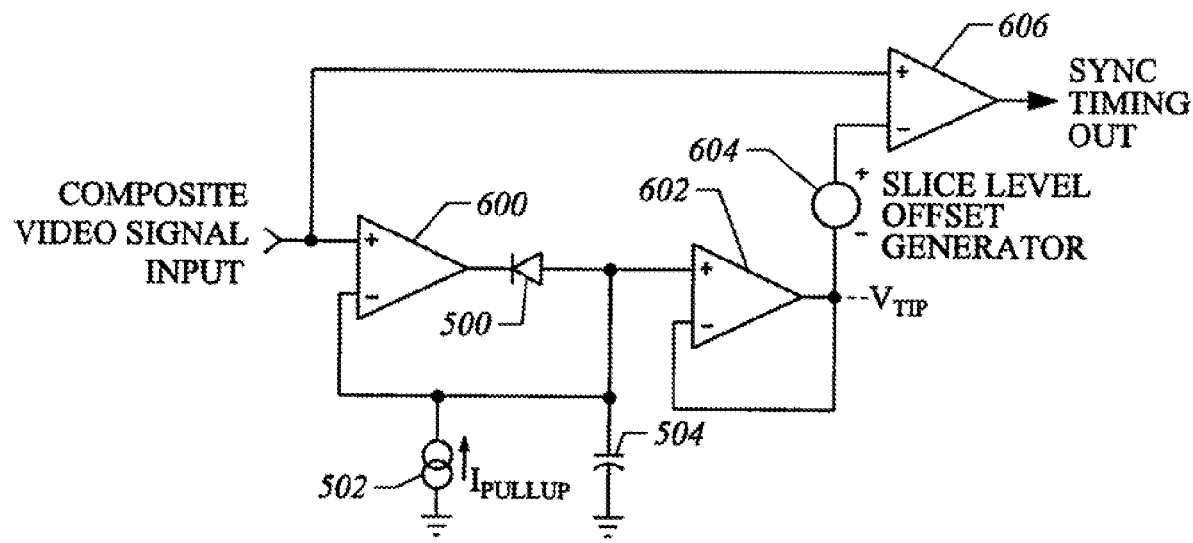
FIG. 6 shows the negative peak detector of FIG. 5 with buffering at its input and output, and with additional circuitry to generate a sync timing signal.

FIG. 6 shows the negative peak detector of FIG. 5 with buffering at its input and output, and with additional circuitry to generate a sync timing signal. Components carried over from FIG. 5 to FIG. 6, as well as components carried over in subsequent drawings, are similarly labeled.

Buffering at the input of the negative peak detector is provided by an operational amplifier 600. Amplifier 600 has a noninverting input receiving the composite video signal, an inverting input connected to the p terminal of the diode 500, and an output connected to the n terminal of diode 500. The amplifier 600 forms an operational rectifier with the diode 500 and, thus, buffers current drawn from the current source 502 from the composite video signal. The amplifier 600 also eliminates diode offset voltage errors with diode 500 not being ideal.

Buffering at the output of the negative peak detector is provided by operational amplifier 602. The amplifier 602 is connected as a voltage follower with a noninverting input connected to the p terminal of the diode 500, and its output and inverting input connected together. The amplifier 602 buffers the sync tip level voltage VTIP on the capacitor 504 from any load.

An amplifier 606 configured as a comparator, and a slice level generator 604 are included with the amplifiers 600 and 602 and negative peak detector to provide a synchronous timing signal. The composite video signal is provided to the noninverting input of the comparator 606. The output of amplifier 602 is provided through a slice level offset generator 604 to the inverting input of the comparator 606. Synchronization timing signals are produced at the output of comparator 606.

In one embodiment, the slice level offset generator 604 generates a fixed DC voltage VSLICE which is added to VTIP at the output of amplifier 602. The output of the comparator 606 will then transition when the composite video signal transitions through the voltage level VTIP+VSLICE.

Figure 7:
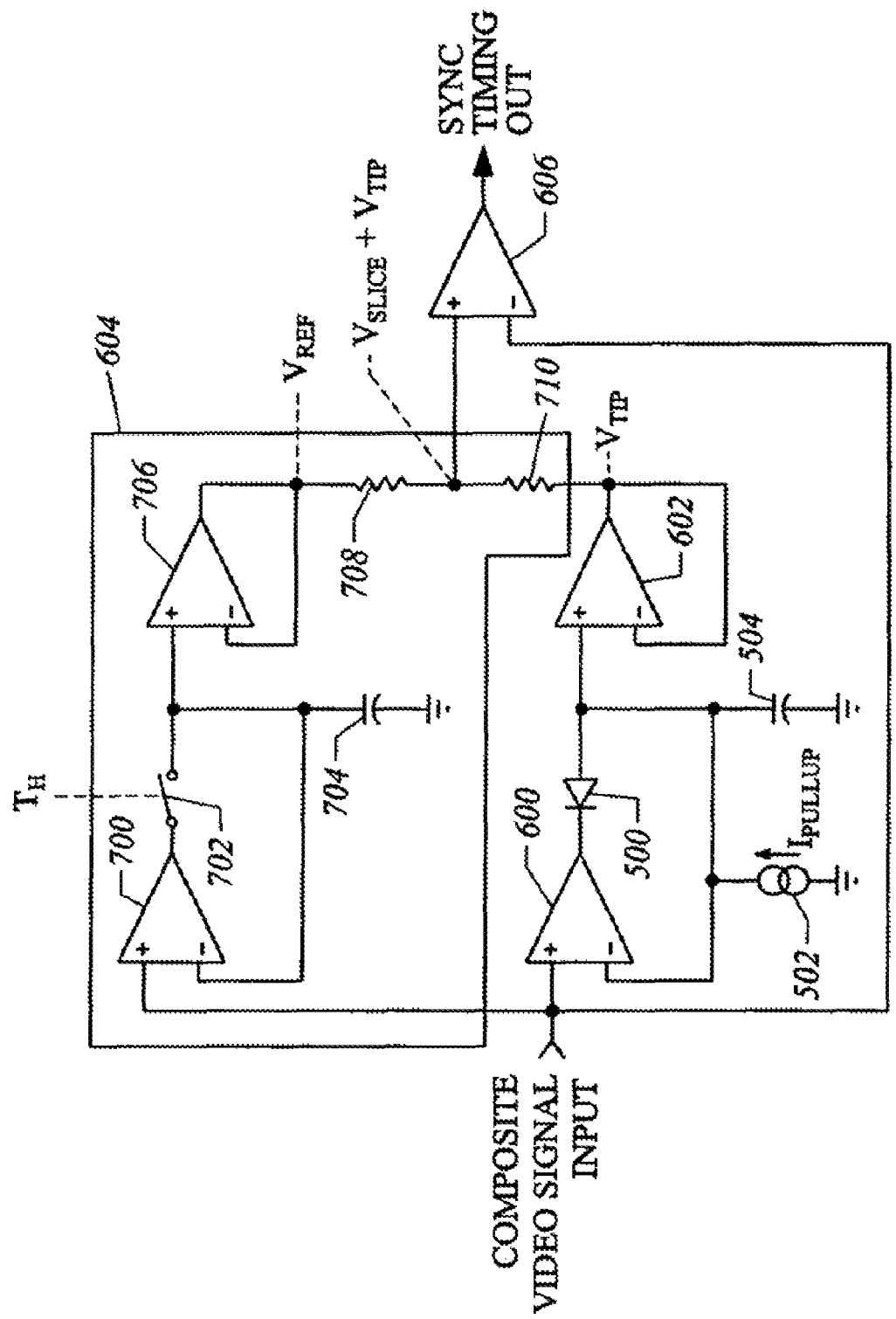
FIG. 7 shows the video synchronization signal generating circuit of FIG. 6 with components for a slice level offset generator providing an adaptive VSLICE value.

Because the composite video signal has a varying amplitude, it may be desirable to have an adaptive rather than a constant VSLICE value. FIG. 7 shows specific components for an embodiment of the slice level generator 604 which can provide such an adaptive VSLICE value.

The offset slice generator 604 of FIG. 7 and includes a sample and hold circuit made up of amplifier 700, switch 702 and capacitor 704. The noninverting input of amplifier 700 receives the composite video signal, while the inverting input of the amplifier is connected by the switch 702 to its output. The noninverting input of amplifier 700 is also connected to capacitor 704. The switch is selectively switched by a signal TH which is timed to close the switch during the breezeway, color burst or back porch segments of the composite video signal, or during any combination of the breezeway, color burst or back porch segments. The capacitor 704, thus, stores a voltage VREF equal to the sampled voltage of the breezeway, color burst, or back porch segments, or the desired combination of these segments.

The voltage held by the capacitor 704 is buffered by operational amplifier 706 and applied to a resistor divider made up of resistors 708 and 710. The operational amplifier 706 is connected in a voltage follower configuration with its noninverting input connected to the inverting input of the amplifier 700, and its inverting input connected to its output. The output of the amplifier 706 is connected to a first terminal of resistor 708, while the output of amplifier 602 is connected to the first terminal of resistor 710. The second end of resistors 708 and 710 are both connected to the noninverting input of comparator 606.

With resistors 708 and 710 having equal values, the output of the comparator 606 will transition when the composite video signal passes through VTIP+VSLICE with VSLICE being half way between VTIP and VREF. The present invention can, thus, provides an adaptive VSLICE value.

With the circuit of FIG. 7, the offset of all four amplifiers 600, 602, 700 and 706, and the comparator 606 can add to cause undesirable errors in the desired signal VTIP+VSLICE. Errors in the value for VTIP+VSLICE show as timing errors since the input to the circuit of FIG. 7 does not have a large slew rate, and even non-functionality if the errors accumulate large compared to undersized input signals.

Figure 8:
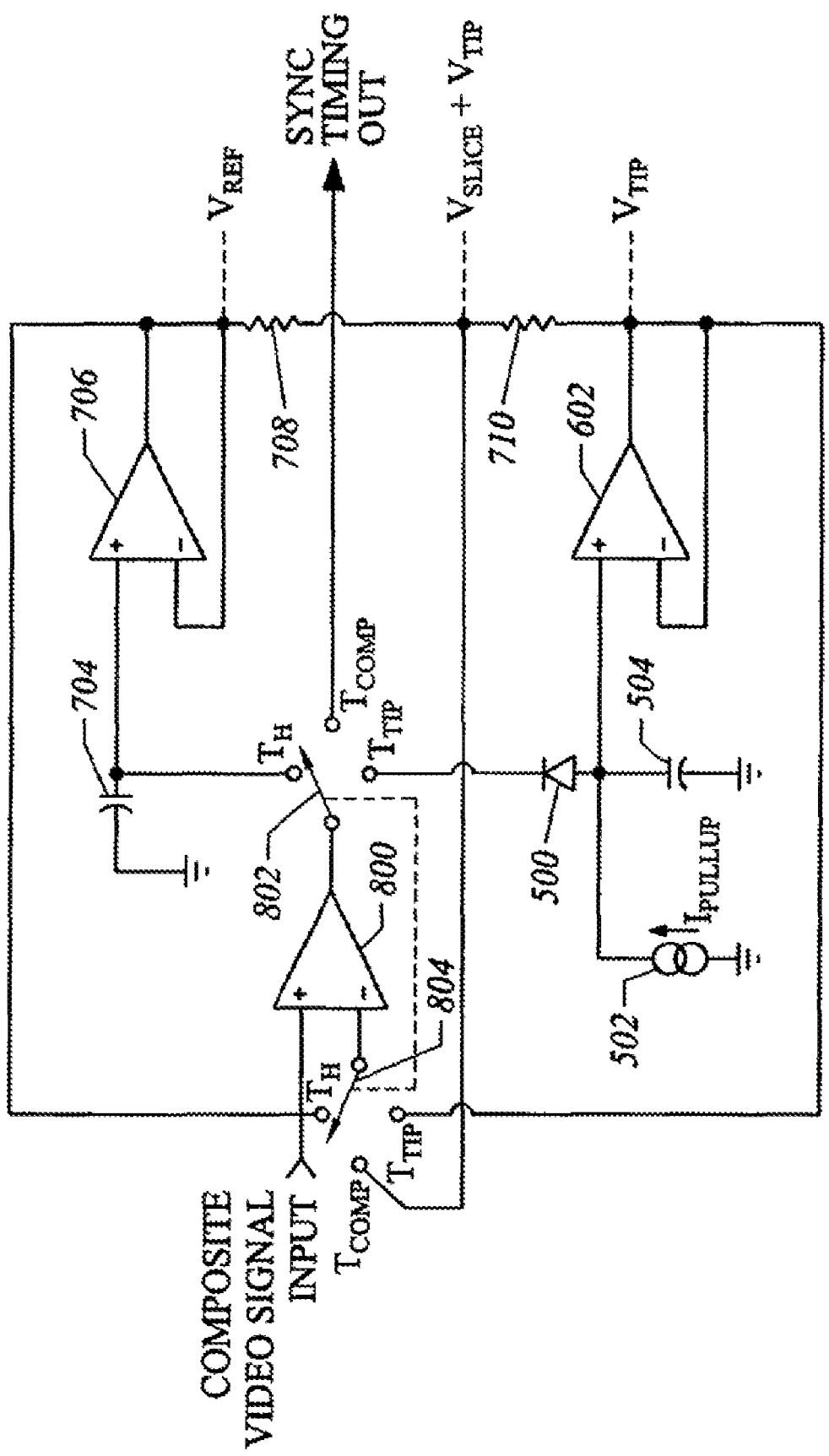
FIG. 8 shows a video synchronization signal generating circuit enabling elimination of amplifier DC offset voltages.

FIG. 8 shows an embodiment of a video synchronization signal generating circuit in accordance with the present invention which enables elimination of amplifier DC offset voltages.

The circuit of FIG. 8 includes an amplifier 800 and switches 802 and 804 to selectively connect the amplifier 800 to different components. The noninverting (+) input of the amplifier 800 receives the composite video signal input. The switch 802 connects the output of the amplifier 800 to one of three terminals labeled TH, TCOMP and TTIP. The switch 804 connects the inverting (−) input of the amplifier 800 to one of three terminals labeled TH, TCOMP and TTIP to correspond with the connections for switch 802. The switches 802 and 804 are controlled to switch together to a terminal with a common label.

When the switches 802 and 804 are set to the TCOMP connections, the amplifier 800 acts as a comparator with no feedback to compare the value VSLICE+VTIP with the composite video signal. The switches 802 and 804 are preferably set to the TCOMP positions during a majority of the composite video signal prior to the negative synchronization tip edge.

With the switches 802 and 804 in the TCOMP position, the (−) input of the amplifier 800 is connected to the output of amplifier 602. Like the amplifier 602 in FIGS. 6 and 7, the amplifier 602 in FIG. 8 is connected in a voltage follower configuration with its (+) input connected to a negative peak detector formed by diode 500, capacitor 504 and current source 502. The diode 500 is disconnected from the output of the amplifier 800 when the switches 802 and 804 are connected in the TCOMP position, but the capacitor 504 will store the voltage value VTIP of the synchronization tip. The value VTIP is measured and stored by capacitor 504 after the negative edge of the synchronization tip signal with the switches 802 and 804 connected to the TTIP connections, as discussed in detail to follow.

The output of the amplifier 602 is connected to the (−) input of the amplifier 800 through a resistor 710 when the switches 802 and 804 are in the TCOMP position. Also, the (−) input of the amplifier 800 is connected to the output of amplifier 706 through resistor 708. The amplifier 706 is connected in a voltage follower configuration similar to the amplifier 706 of FIG. 7. The capacitor 704 is charged up to a voltage VREF equal to the sampled voltage of the breezeway, color burst, or back porch segments, or the desired combination of these segments. The capacitor 704 is charged up to VREF when the switches 802 and 804 are in the TH position as described in more detail to follow.

With resistors 708 and 710 having equal values, the output of the amplifier 800 will transition when the composite video signal passes through VTIP+VSLICE, VSLICE being half way between VTIP and VREF. Further, any offset in amplifier 800 is stored in capacitors 504 and 704 and is superimposed on the VSLICE value by amplifiers 602 and 706 and fed back to the (−) input of amplifier 800. Functioning as a comparator, the offset of the amplifier 800 is now cancelled with respect to the input. Any offset of amplifiers 602 and 706 will be reduced by the voltage gain of amplifier 800 with respect to the input of the synchronous detector circuit.

After the output of the synchronous detector circuit signals the negative edge of the synchronization tip, the switches 802 and 804 are set to TTIP. The amplifier 800 then is disconnected from providing the sync timing output signal and acts only as a buffer for a negative peak detector. The amplifier 800 has a (+) input receiving the composite video signal as in FIGS. 6 and 7, but instead of having the (−) input connected directly to the p terminal of the diode 500, the (−) input is buffered from the diode 500 through the voltage follower amplifier 602. As connected, the amplifier 800 will reduce the offset of diode 500 as well as the offset of amplifier 602.

The switches 802 and 804 are left in the TTIP position until the capacitor 504 charges up to the synchronization tip voltage level VTIP. After a time period for the capacitor 504 to adequately charge, the switches 802 and 804 are set to TCOMP again, waiting for the positive going edge of the synchronization tip.

After the positive-going edge of the synchronous tip is perceived, the switches 802 and 804 are set to the TH connections. As with the circuit of FIG. 7, the time period for TH can be during the breezeway, color burst or back porch segments of the composite video signal, or during any combination of the breezeway, color burst or back porch segments. The switches 802 and 804 are connected to the TH connections during the desired segments and returned to the TCOMP connections afterward.

With the switches 802 and 804 connected in the TH position, the amplifier 800 functions similar to the amplifier 700 of FIG. 7 with capacitor 704 to form a sample and hold circuit. Rather than being connected directly to the capacitor 604 like the (−) input of amplifier 700 of FIG. 7, the (−) input of the amplifier 800 is connected to the capacitor 704 through the voltage follower amplifier 706. The offset of amplifier 706 is reduced by this loop.

With the switches 802 and 804 connected in the TH position, the capacitor 704 will charge up to and store a voltage VREF equal to the sampled voltage of the breezeway, color burst, or back porch segments, or the desired combination of these segments. After the desired segments, the switches 802 and 804 will be placed in the TCOMP positions until the negative going edge of the synchronization tip is detected again.

Although the invention has been described above with particularity, this was merely to teach one of ordinary skill in the art how to make and use the invention. Many modifications will fall within the scope of the invention, as that scope is defined by the claims which follow.

What is claimed is:

1. A video synchronization signal generating circuit, comprising:
 a sample and hold circuit;
 a voltage divider to produce an adaptive voltage level based at least in part on an output of said sample and hold circuit; and
 an amplifier that receives a video signal, said amplifier connectable by switches in different configurations;
 wherein in a first configuration said amplifier acts as a comparator to compare the adaptive voltage level with the video signal, an output of said amplifier in said first configuration being an output of the video synchronization signal generating circuit; and
 wherein in a second configuration said amplifier forms part of the sample and hold circuit.

2. The video synchronization signal generating circuit of claim 1, wherein:
 said switches connect said amplifier in said first configuration during a majority of the video signal prior to a negative synchronization tip edge.

3. The video synchronization signal generating circuit of claim 1, wherein said output of said amplifier in said first configuration transitions when the video signal transistions through the adaptive voltage level.

4. The video synchronization signal generating circuit of claim 1, wherein said switches configure said amplifier in said second configuration during a portion of the video signal other than a sync tip and picture content.

5. The video synchronization signal generating circuit of claim 4, wherein said sample and hold circuit includes a capacitor to store a reference voltage equal to a sampled voltage of the portion of the video signal other than the sync tip and picture content, the reference voltage being the output of said sample and hold circuit.

6. The video synchronization signal generating circuit of claim 1, wherein said amplifier is connected in a voltage follower configuration when said amplifier is in said second configuration.

7. The video synchronization signal generating circuit of claim 1, wherein said sample and hold circuit and said voltage divider comprise portions of a slice level generator.

8. The video synchronization signal generating circuit of claim 7, wherein said slice level generator further comprises a further amplifier configured in a voltage follower configuration to buffer the reference voltage stored on said capacitor.

9. The video synchronization signal generating circuit of claim 1, wherein in said first configuration said amplifier acts as a comparator with no feedback.

10. The video synchronization signal generating circuit of claim 1, wherein the voltage divider includes a plurality of resistors.

11. The video synchronization signal generating circuit of claim 1, wherein the voltage divider includes resistors connected in series, with a terminal common to two said resistors providing the adaptive voltage level that the comparator compares with the video signal.

12. A video synchronization signal generating circuit, comprising:
a slice level generator including a sample and hold circuit; and
an amplifier that receives a video signal, said amplifier connectable by switches in different configurations;
wherein in a first configuration said amplifier acts as a comparator to compare an adaptive voltage level with the video signal, an output of said amplifier in said first configuration being an output of the video synchronization signal generating circuit; and
wherein in a second configuration said amplifier forms part of the sample and hold circuit.

13. The video synchronization signal generating circuit of claim 12, wherein the adaptive voltage level varies as the output of the sample and hold circuit varies.

14. A video synchronization signal generating circuit, comprising:
an amplifier that receives a video signal, said amplifier connectable by switches in different configurations;
wherein in a first configuration said amplifier acts as a comparator to compare an adaptive voltage level with the video signal;
wherein in a second configuration said amplifier forms part of a circuit that charges up a first capacitor to produce a second voltage, which is used to produce the adaptive voltage level;
wherein in a third configuration said amplifier forms part of a further circuit that charges up a second capacitor to produce a third voltage, which is also used to produce the adaptive voltage level; and
wherein an offset in said amplifier, which affects both the first and second voltages, is canceled out when said amplifier acts as a comparator in said first configuration.

15. The video synchronization signal generating circuit of claim 14, wherein an output of said amplifier in said first configuration is an output of the video synchronization signal generating circuit.

16. A method for producing a synchronization timing output, comprising:
providing a video signal to an amplifier that is connectable by switches in different configurations;
connecting the amplifier in a first configuration wherein the amplifier acts as a comparator to compare an adaptive voltage level with the video signal, wherein an output of the amplifier in the first configuration is a synchronization timing output;
connecting the amplifier in a second configuration wherein the amplifier forms part of a sample and hold circuit that is used to produce a reference voltage level; and
using the reference voltage level to produce the adaptive voltage level.

17. The method of claim 16, wherein the steps of connecting the amplifier include:
connecting the amplifier in the first configuration during a majority of the video signal prior to a negative synchronization tip edge; and
connecting the amplifier in the second configuration during a portion of the video signal other than a sync tip and picture content.

18. The method of claim 16, wherein the output of the amplifier in the first configuration transitions when the video signal transitions through the adaptive voltage level.

19. The method of claim 16, comprising:
producing the adaptive voltage level using a plurality of resistors.

20. A method for producing a synchronization timing output, comprising:
providing a video signal to an amplifier that is connectable by switches in different configurations;
connecting the amplifier in a first configuration wherein the amplifier acts as a comparator to compare an adaptive voltage level with the video signal, wherein an output of the amplifier in the first configuration is a synchronization timing output;
connecting the amplifier in a second configuration wherein said amplifier forms part of a circuit that charges up a first capacitor to produce a second voltage, which is used to produce the adaptive voltage level; and
connecting the amplifier in a third configuration wherein said amplifier forms part of a further circuit that charges up a second capacitor to produce a third voltage, which is also used to produce the adaptive voltage level;
wherein an offset in the amplifier, which affects both the first and second voltages, are canceled out when said amplifier acts as a comparator in the first configuration.

* * * * *